(12) United States Patent
Katayama et al.

(10) Patent No.: US 7,362,937 B2
(45) Date of Patent: Apr. 22, 2008

(54) OPTICAL FIBER, OPTICAL FIBER AMPLIFIER, AND OPTICAL FIBER LASER LIGHT SOURCE

(75) Inventors: Tetsutaro Katayama, Kanagawa (JP); Shinji Ishikawa, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 185 days.

(21) Appl. No.: 11/218,786

(22) Filed: Sep. 6, 2005

(65) Prior Publication Data
US 2006/0078009 A1 Apr. 13, 2006

(30) Foreign Application Priority Data
Sep. 27, 2004 (JP) ............... 2004-280138

(51) Int. Cl.
*G02B 6/02* (2006.01)
(52) U.S. Cl. ............ 385/123; 385/125; 385/126; 385/134; 385/135
(58) Field of Classification Search .......... 385/123
See application file for complete search history.

(56) References Cited

U.S. PATENT DOCUMENTS

| | | | | |
|---|---|---|---|---|
| 6,990,282 | B2* | 1/2006 | Russell et al. | 385/125 |
| 7,062,140 | B2* | 6/2006 | Bjarklev et al. | 385/125 |
| 7,221,822 | B2* | 5/2007 | Grudinin et al. | 385/30 |
| 2003/0059185 | A1* | 3/2003 | Russell et al. | 385/125 |
| 2004/0156572 | A1* | 8/2004 | Richardson et al. | 385/1 |
| 2005/0105866 | A1* | 5/2005 | Grudinin et al. | 385/123 |
| 2005/0111804 | A1* | 5/2005 | Bjarklev et al. | 385/125 |
| 2005/0265678 | A1* | 12/2005 | Manyam et al. | 385/127 |
| 2006/0013545 | A1* | 1/2006 | Varnham et al. | 385/123 |

FOREIGN PATENT DOCUMENTS

WO  WO 03/019257 A1  3/2003

OTHER PUBLICATIONS

British Search Report dated Nov. 15, 2005 in corresponding Application No. GB0517174.9.
J. Zhou, et al., "PMD characteristics of twisted photonic crystal fibre," Electronics Letters, Mar. 31, 2005, pp. 403-405, vol. 47, No. 7.
C. Simonneau, et al., "High-power air-clad photonic crystal fiber cladding-pumped EDFA for WDM applications in the C-Band," ECOC-IOOC 2003, Proceedings, 2003, p. 34-35, vol. 6—Post-Deadline Papers.

\* cited by examiner

*Primary Examiner*—Frank G. Font
*Assistant Examiner*—Mary El-Shammaa
(74) *Attorney, Agent, or Firm*—McDermott Will & Emery LLP

(57) ABSTRACT

An optical fiber can efficiently excite metallic ions by a pump lightwave, and an optical fiber amplifier and an optical fiber laser light source both incorporate the optical fiber. The optical fiber comprises (a) a solid region that has a first region doped with metallic ions and a second region surrounding the first region and that allows a lightwave for exciting the metallic ions to travel in a multiple mode and (b) a third region surrounding the second region and having a plurality of holes stretching along the length of the optical fiber. The optical fiber has a structure in which the first region is supplied with the power of a lightwave that is included in the pump lightwave and that is in a mode having no intensity peak at the center axis of the solid region.

18 Claims, 13 Drawing Sheets

OPTICAL FIBER, OPTICAL FIBER AMPLIFIER, AND OPTICAL FIBER LASER LIGHT SOURCE

BACKGROUND OF THE INVENTION

1. Field of the Invention

The present invention relates to an optical fiber and to an optical fiber amplifier and an optical fiber laser light source both incorporating the optical fiber.

2. Description of the Background Art

An optical fiber amplifier and an optical fiber laser light source sometimes incorporate a double-cladding-type optical fiber as the amplification medium. This optical fiber is composed of (a) a core region doped with metallic ions that are excited when a pump lightwave is supplied, (b) a first cladding region surrounding the core region, and (c) a second cladding region further surrounding the first cladding region. A solid region composed of the core region and the first cladding region guides the pump lightwave, and the core region guides a signal lightwave. Because the metallic ions are excited by the pump lightwave, when a signal lightwave travels in the core region, the metallic ions emit stimulated-emission light to amplify the signal lightwave.

As the foregoing double-cladding-type optical fiber, in recent years, a holey fiber has been used that has a second cladding region provided with a plurality of holes stretching along the length of the fiber. (See, for example, a literature written by C. Simonneau et al., "High-power air-clad photonic crystal fiber cladding-pumped EDFA for WDM applications in the C-band," ECOC-IOOC 2003, Proceedings Volume 6—Post-Deadline Papers, Sep. 21-25, 2003, pp. 34-35.) In this holey fiber, the refractive-index difference of the first cladding region to the second cladding region is further increased. As a result, the numerical aperture of the solid region is increased. Consequently, the solid region can confine an increased quantity of the pump lightwave to guide it. Thus, the excitation efficiency of the metallic ions is increased.

However, the conventional double-cladding-type optical fiber has a first cladding region whose center is nearly coincident with that of the core region. Therefore, in the case of a pump lightwave travelling in a mode having no intensity peak in the core region, the metallic ions cannot be excited. In other words, the energy of the pump lightwave cannot be used efficiently to excite the metallic ions.

SUMMARY OF THE INVENTION

An object of the present invention is to offer an optical fiber capable of efficiently exciting metallic ions and to offer an optical fiber amplifier and an optical fiber laser light source both incorporating the optical fiber.

To attain the foregoing object, the present invention offers an optical fiber comprising:

(a) a solid region that:

(a1) has a first region doped with at least one type of metallic ion and a second region surrounding the first region; and (a2) allows a pump lightwave including in its wavelength range a wavelength for exciting the at least one type of metallic ion to travel in a multiple mode; and (b) a third region that surrounds the second region and that is provided with a plurality of holes stretching along the length of the optical fiber. The optical fiber has a structure in which the first region is supplied with the power of a lightwave that is included in the pump lightwave and that is in a mode having no intensity peak at the center axis of the solid region. The foregoing structure may be formed either by the twisting of the optical fiber or by an arrangement in which the first region is placed at a position apart from the center axis of the solid region.

In the above description, the term "the center axis of a region" means an imaginary line stretching along the length of the optical fiber at the center of a cross section perpendicular to the direction of the length of the region when the cross section has a nearly circular shape. If the cross section has a nearly elliptic shape, the term means an imaginary line stretching along the length of the optical fiber at the intersection point of the major axis and the minor axis of the cross section.

According to an aspect of the present invention, the present invention offers an optical fiber amplifier comprising an optical fiber of the present invention, a light source section for outputting a pump lightwave, and a means of supplying the pump lightwave and a signal lightwave to the optical fiber.

According to another aspect of the present invention, the present invention offers an optical fiber laser light source comprising an optical fiber of the present invention, a light source section for outputting a pump lightwave, a means of supplying the pump lightwave to the optical fiber, and an optical resonator for resonating the light emitted from the at least one type of metallic ion.

BRIEF DESCRIPTION OF THE DRAWING

The features, aspects, and advantages of the present invention will be better understood by reference to the following description, the appended claims, and the accompanying drawings where:

DETAILED DESCRIPTION OF THE INVENTION

First Embodiment

Figure 1:
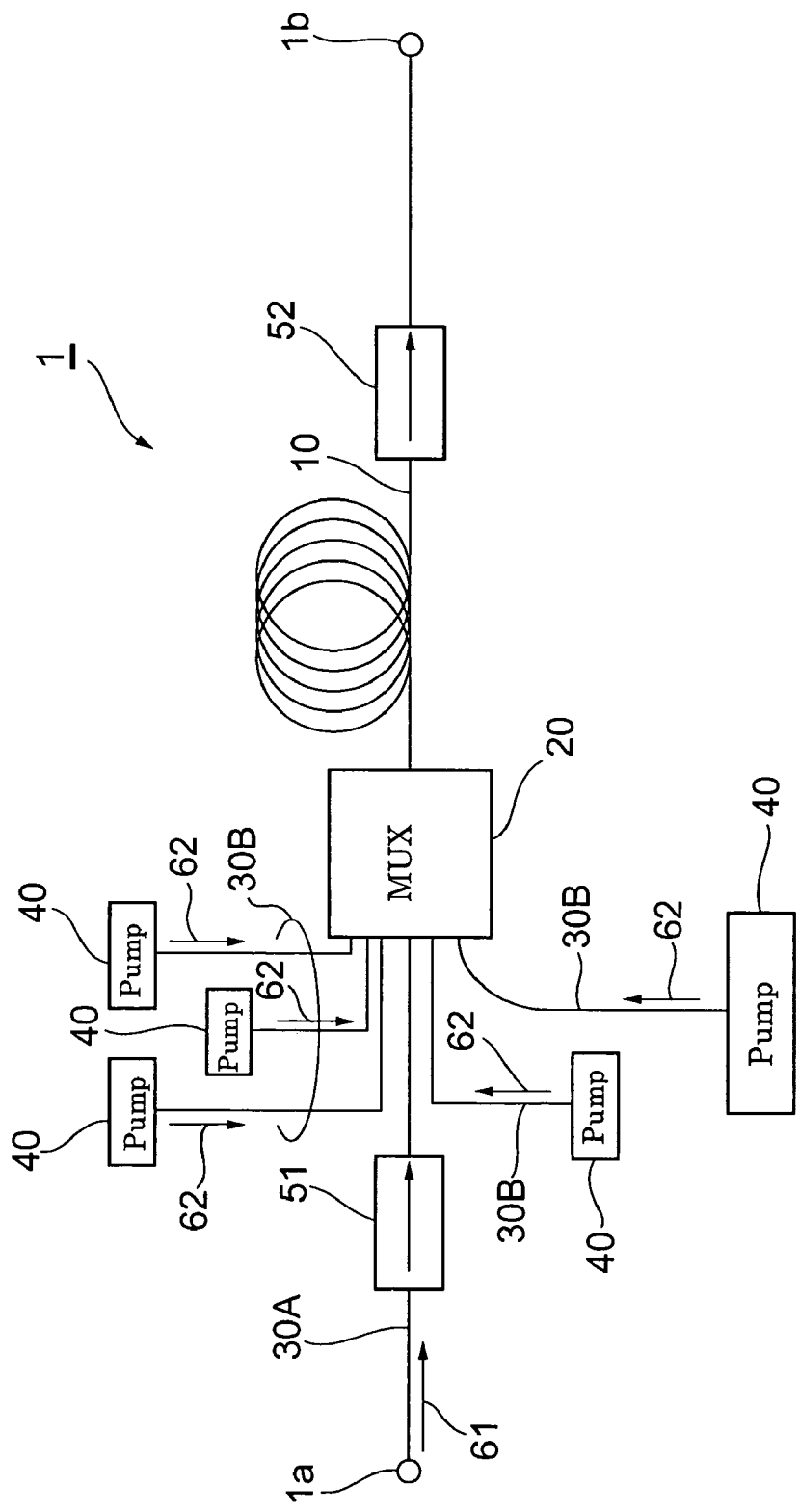
FIG. 1 is a conceptual diagram showing a first embodiment of an optical fiber amplifier of the present invention.

FIG. 1 is a conceptual diagram showing a first embodiment of an optical fiber amplifier of the present invention. An optical fiber amplifier 1 that optically amplifies a signal lightwave by being supplied with a pump lightwave has (a) an optical fiber 10, (b) light source sections 40 for outputting pump lightwaves, (c) a light-supplying means (multiplexer 20) for supplying the pump lightwaves and a signal lightwave to the optical fiber, (d) connection-use optical fibers 30A and 30B, and (e) isolators 51 and 52 provided for the optical fibers 30A and 10, respectively. The optical fiber amplifier 1 optically amplifies a signal lightwave 61 inputted from an input end 1a to output it from an output end 1b. The provision of the isolators 51 and 52 prevents light from travelling from the output-end-1b side toward the input-end-1a side. The foregoing optical fiber amplifier 1 is used in an optical communication system, for example.

Figure 2A:
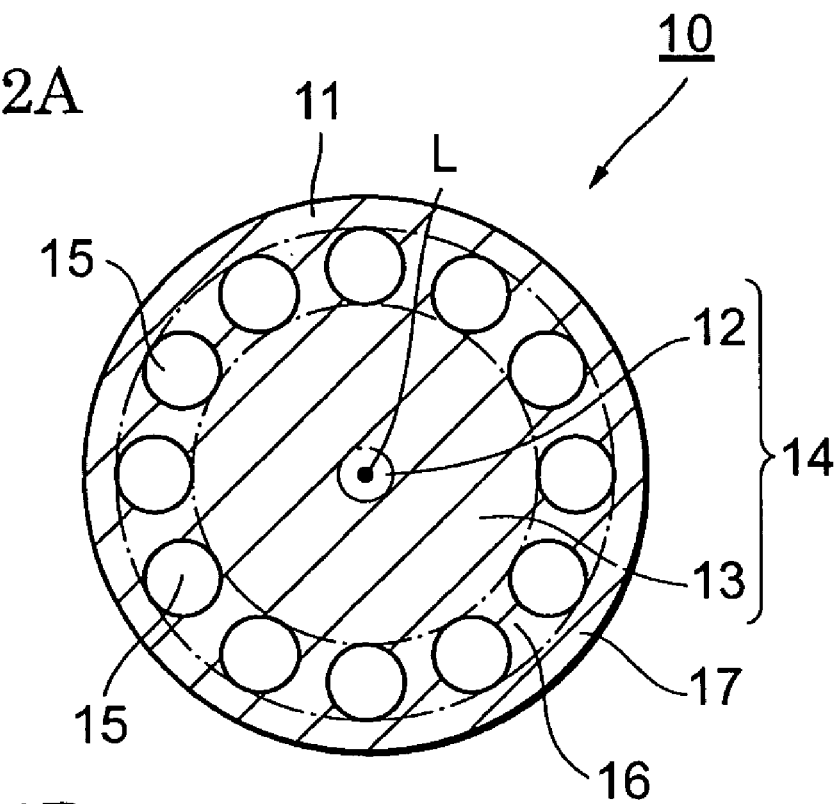
FIG. 2A is a cross section at a plane perpendicular to the direction of the length of an optical fiber of the present invention shown as an example.
Figure 2B:
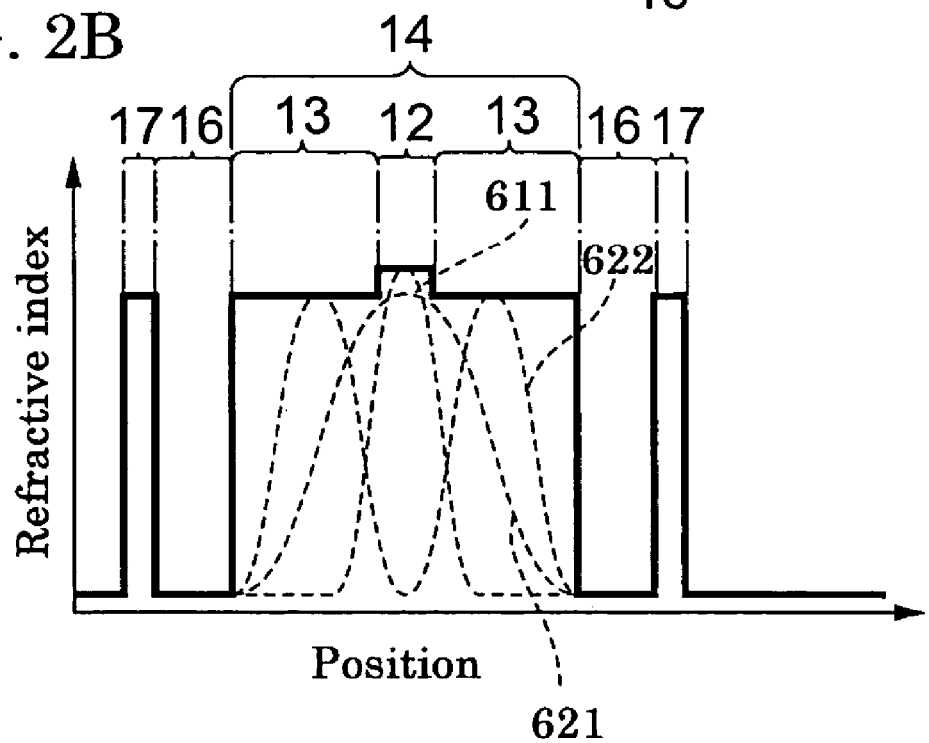
FIG. 2B is a diagram showing a refractive-index profile of the optical fiber.

The optical fiber 10 is a linear body composed mainly of silica glass. It has a total length of about 32 meters, for example. FIG. 2A is a cross section at a plane perpendicular to the direction of the length of an optical fiber of the present invention shown as an example, and FIG. 2B is a diagram showing a refractive-index profile of the optical fiber. The optical fiber 10 has (a) a solid region 14 that has a first region (core region 12) doped with at least one type of metallic ion and a second region (first cladding region 13) surrounding the first region and that allows a pump lightwave including in its wavelength range a wavelength for exciting the at least one type of metallic ion to travel in a multiple mode, and (b) a third region (second cladding region 16) that surrounds the second region and that is provided with a plurality of holes (fiber holes 15) stretching along the length of the optical fiber. The optical fiber 10 has a structure in which the first region is supplied with the power of a lightwave that is included in the pump lightwave and that is in a mode having no intensity peak at the center axis L of the solid region.

The core region 12 is composed of silica glass doped with, for example, 10% $GeO_2$ by weight. In the first embodiment, the metallic ion is a rare-earth ion, more specifically $Er^{3+}$. The doped amount of $Er^{3+}$ is 600 wt. ppm, for example. Furthermore, the core region 12 is additionally doped with $Al^{3+}$ as a supplemental metallic ion to improve the optically amplifying property. The doped amount of $Al^{3+}$ is 4% by weight, for example, in terms of $Al_2O_3$. The doping of $Al^{3+}$ can produce a broad-band property in which the gain peak is flattened. The metallic ion may be $Yb^{3+}$, for example. It may also be $Bi^{3+}$. In the following explanation, unless otherwise specified, it is assumed that the core region 12 is doped with $Er^{3+}$. The core region 12 has a diameter of about 3.4 μm and allows the signal lightwave 61 having a wavelength of $\lambda_1$ to travel in a single mode.

The first cladding region 13 is made of silica glass. To confine the signal lightwave 61 in the core region 12, the core region 12 has a refractive index larger than that of the first cladding region 13. The solid region 14 composed of the first cladding region 13 and the core region 12 has a diameter of about 154 μm. The solid region 14 allows the pump lightwave 62 having a wavelength of $\lambda_2$ for exciting the $Er^{3+}$ to travel in a multiple mode.

The second cladding region 16 made of silica glass is provided around the first cladding region 13. The second cladding region 16 is provided with fiber holes 15 stretching along the length of the optical fiber. A support region 17 made of silica glass is provided around the second cladding region 16 to support it. Because the fiber holes 15 are placed along the outer circumference of the first cladding region 13, a large refractive-index difference is produced between the first cladding region 13 and the second cladding region 16. As a result, the pump lightwave 62 can be guided by securely confining it in the solid region 14. Furthermore, the numerical aperture (NA) of the optical fiber 10 for the pump lightwave 62 can be increased, for example, to as high as 0.17.

As shown in FIG. 1, the end of the optical fiber 10 at the input-end-1a side of the optical fiber amplifier 1 is connected to one end of the multiplexer 20 for supplying the signal lightwave 61 and the pump lightwave 62. The other end of the multiplexer 20 is connected to the optical fibers 30A and 30B. The optical fiber 30A is a standard optical fiber (SMF28) for communication use. It transmits the signal lightwave 61 having entered from the input end 1a in a single mode to input it into the multiplexer 20. The optical fibers 30B are each a multimode fiber having a core diameter of about 100 μm and an NA of about 0.2. They are optically coupled with the light source sections 40. The optical fiber 30B transmits the pump lightwave 62 outputted from the light source section 40 to input it into the multiplexer 20. The light source section 40 has no particular limitation providing that it can output the pump lightwave 62 having a wavelength of $\lambda_2$ capable of exciting the $Er^{3+}$ contained in the optical fiber 10. It is composed of a semiconductor laser device, for example.

Figure 3:
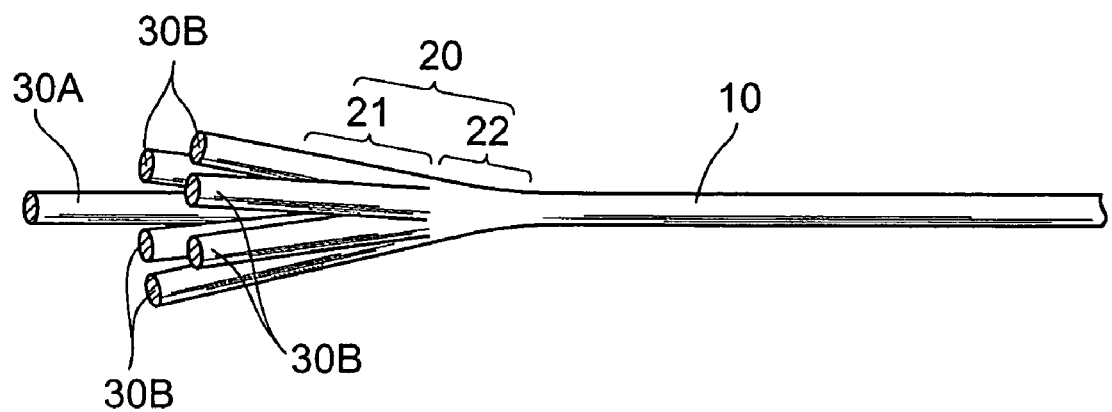
FIG. 3 is a perspective view showing a multiplexer used in an optical fiber amplifier of the first embodiment.

FIG. 3 is a perspective view showing a multiplexer used in an optical fiber amplifier of the first embodiment. The multiplexer 20 to which the optical fibers 30A and 30B are connected is composed of (a) a bundled region 21 in which the optical fibers 30A and 30B are bundled and (b) a tapered region 22 in which the diameter of the multiplexer is reduced from the bundled region 21 toward the optical fiber 10 until the multiplexer is fusion-connected to the optical fiber 10. In the tapered region 22, the optical fibers 30A and 30B are fusion-connected to one another to be unified. Furthermore, in the tapered region 22, the optical fiber 30A is placed so as to be optically coupled with the core region 12 of the optical fiber 10, and the optical fibers 30B are placed so as to be optically coupled with the solid region 14. This structure enables the supply of the signal lightwave 61 and the pump lightwaves 62 to the core region 12 and the solid region 14, respectively.

The operation of the optical fiber amplifier 1 is explained below. The pump lightwave 62, having a wavelength of $\lambda_2$ (for example, about 0.98 μm), outputted from the light source section 40 travels over the optical fiber 30B in a multiple mode, passes through the multiplexer 20, enters the solid region 14 of the optical fiber 10, and travels through the solid region 14 in a multiple mode (shown by dashed lines 621 and 622 in FIG. 2B). When the signal lightwave 61, having a wavelength of $\lambda_1$ (for example, about 1.55 μm), is inputted from the input end 1a, it travels over the optical fiber 30A in a single mode, passes through the multiplexer 20, enters the core region 12 of the optical fiber 10, and travels through the core region 12 in a single mode (shown by a dashed line 611 in FIG. 2B). At this moment, the $Er^{3+}$ is excited by the pump lightwave 62 to form the population inversion. Therefore, when the signal lightwave 61 travels through the core region 12, the emission of the stimulated-emission light from the $Er^{3+}$ optically amplifies the signal lightwave 61.

The optical fiber amplifier 1 uses the optical fiber 10 that is produced as a holey fiber. Consequently, the optical fiber 10 has a high NA value (for example, 0.17) for the pump lightwave 62. Because of this, the optical fiber 30B for transmitting the pump lightwave 62 is designed to have a high NA value (for example, 0.20). As a result, the pump lightwave 62 can be supplied to the solid region 14 with high efficiency. This arrangement increases the intensity of the pump lightwave 62 in the solid region 14, thereby facilitating the formation of the population inversion to increase the optical amplification efficiency.

The modes of the pump lightwave 62 travelling through the solid region 14 in a multiple mode include a mode 622 having no intensity peak in the vicinity of the center axis L (that is, in the core region 12) of the solid region 14. The pump lightwave 62 travelling in the mode 622 has only a little contribution to the excitation of the $Er^{3+}$. In order to effectively use the energy of the pump lightwave 62 to excite the $Er^{3+}$, the optical fiber 10 has a structure in which the core region 12 is supplied with the power of the pump lightwave in the mode 622. In the first embodiment, this structure is formed by the twisting of the optical fiber 10.

Figure 4A:
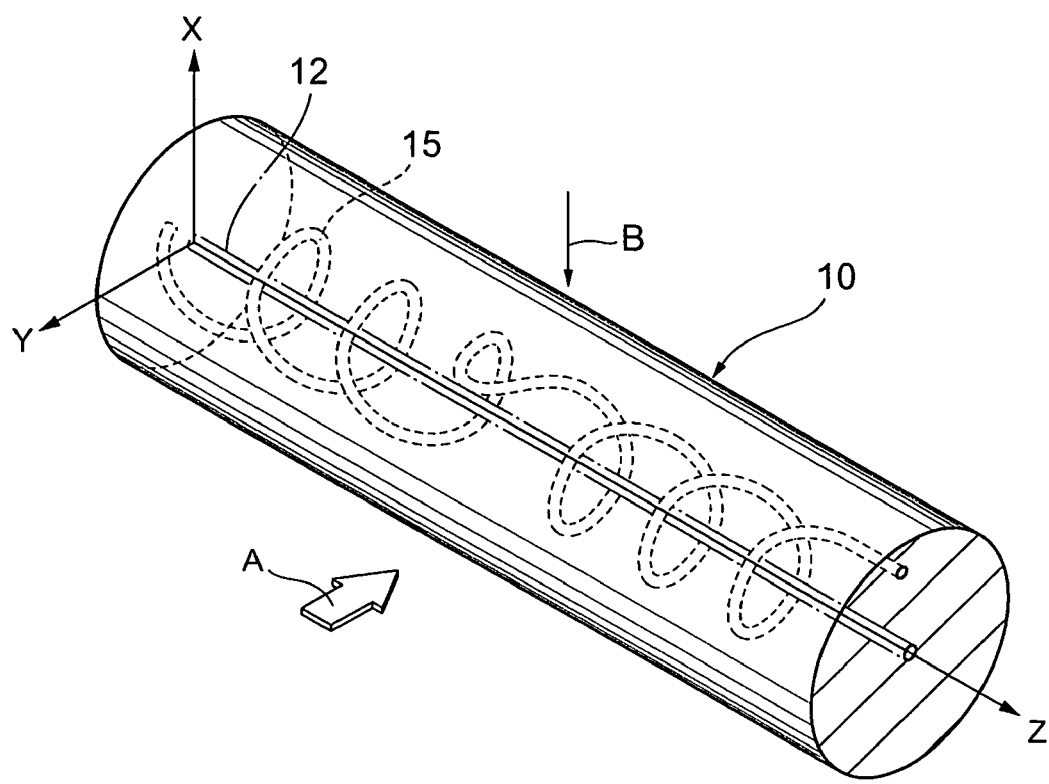
FIG. 4A is a perspective view explaining the twisting of the optical fiber in an example.
Figure 4B:
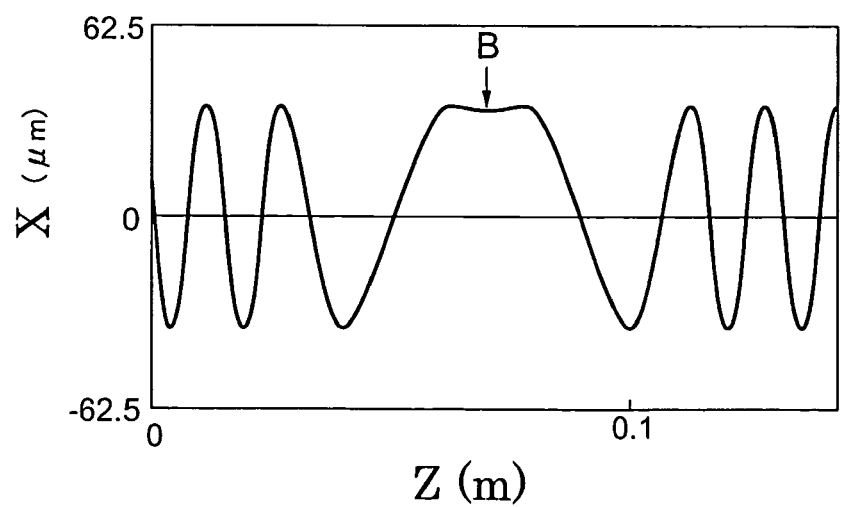
FIG. 4B is a chart showing the position of the fiber hole shown in FIG. 4A.

FIG. 4A is a perspective view explaining the twisting of the optical fiber 10. In FIG. 4A, the X, Y, and Z axes represent an orthogonal-coordinate system, and the Z axis represents the center axis of the optical fiber 10. FIG. 4A shows only one fiber hole 15. FIG. 4B is a chart showing the position of the fiber hole 15 when the optical fiber 10 is viewed from the side (in a direction shown by an arrow A). In FIG. 4B, the horizontal axis corresponds to the Z axis in FIG. 4A, and the vertical axis to the X axis. As shown in FIG. 4A, the direction of the twisting is reversed at least once in the length of the optical fiber 10 (at the place shown by an arrow B).

The twisting of the optical fiber 10 produces a disturbance. As a result, the transfer of energy occurs between the modes included in the multiple mode of the pump lightwave 62. More specifically, while the pump lightwave 62 travels through the solid region 14, the energy in a mode having an intensity distribution that decreases the intensity at the core region 12 transfers to a mode having an intensity distribution that increases the intensity at the core region 12 (for example, the fundamental mode). Consequently, even the pump lightwave 62 that is not absorbed by the $Er^{3+}$ if the optical fiber 10 is not twisted is absorbed by the $Er^{3+}$. This means that the $Er^{3+}$ is effectively excited by the pump lightwave, and the formation of the population inversion is facilitated to increase the optical amplification efficiency. Furthermore, as described below, the reversion of the twisting direction at least once facilitates the production of the optical fiber 10 in comparison with the case where no reversion is given in the direction of the twisting.

The optical fiber 10 is twisted such that the fiber hole 15 makes at least one complete turn per meter of the optical fiber 10. When the amount of the twisting is at least 90 degrees per meter of the optical fiber 10, the disturbance produced by the twisting has an effect of facilitating the transfer of energy between the modes of the pump lightwave 62 travelling in a multiple mode. As a result, the exciting efficiency of the metallic ion is increased.

Figure 5A:
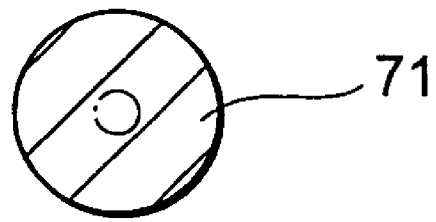
FIGS. 5A and 5B are cross-sectional views of a glass material for producing the optical fiber in an example.
Figure 5B:
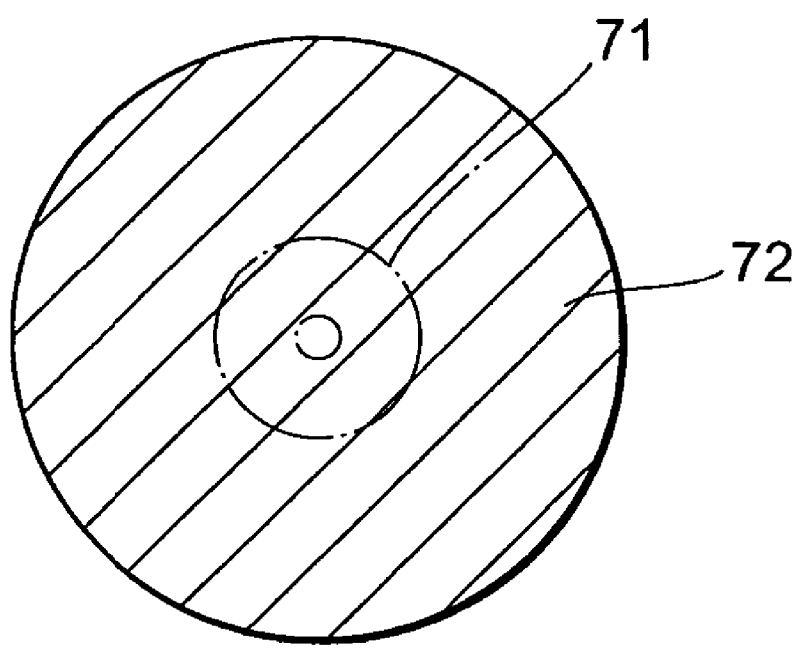
Figure 6:
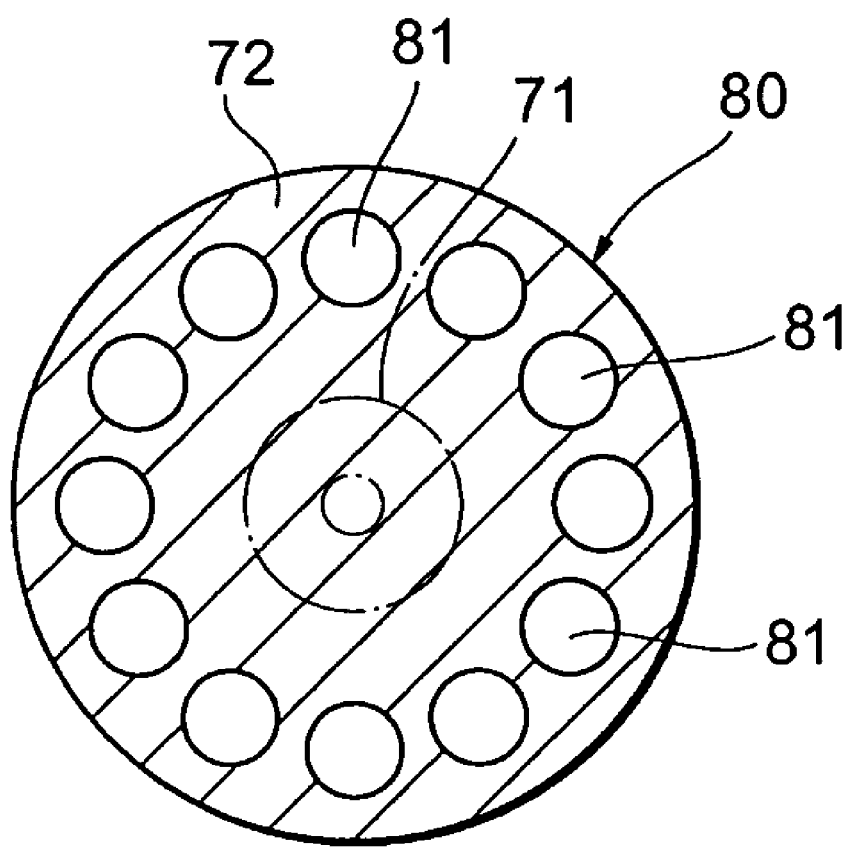
FIG. 6 is a cross-sectional view of an optical fiber preform for producing the optical fiber of an example.

A method of producing the optical fiber 10 is explained below. FIGS. 5A and 5B are cross-sectional views of a glass material for producing the optical fiber 10. FIG. 6 is a cross-sectional view of an optical fiber preform for producing the optical fiber 10. First, a pipe is prepared that is made of silica glass and that is to become a part of the first cladding region 13. In the glass pipe, a glass layer doped with specified amounts of $Er^{3+}$, $GeO_2$, and $Al_2O_3$ is formed by the MCVD process. The glass layer is to become the core region 12. Next, the pipe having the formed glass layer therein is heated and collapsed to form a rod 71. In the rod 71, the region surrounded by alternate long and short dashed lines is to become the core region 12.

Subsequently, the rod 71 is elongated. The elongated rod 71 is inserted into a pipe 72 that is made of silica glass and that is provided with a hole for housing the rod 71 at the center. The pipe 72 is collapsed onto the rod 71 such that their center axes are nearly coincident with each other. Then, fiber preform holes 81 are formed as the holes to become the fiber holes 15. The thus prepared glass body is elongated until it has a specified diameter to obtain an optical fiber preform 80 ready for the drawing.

Figure 7:
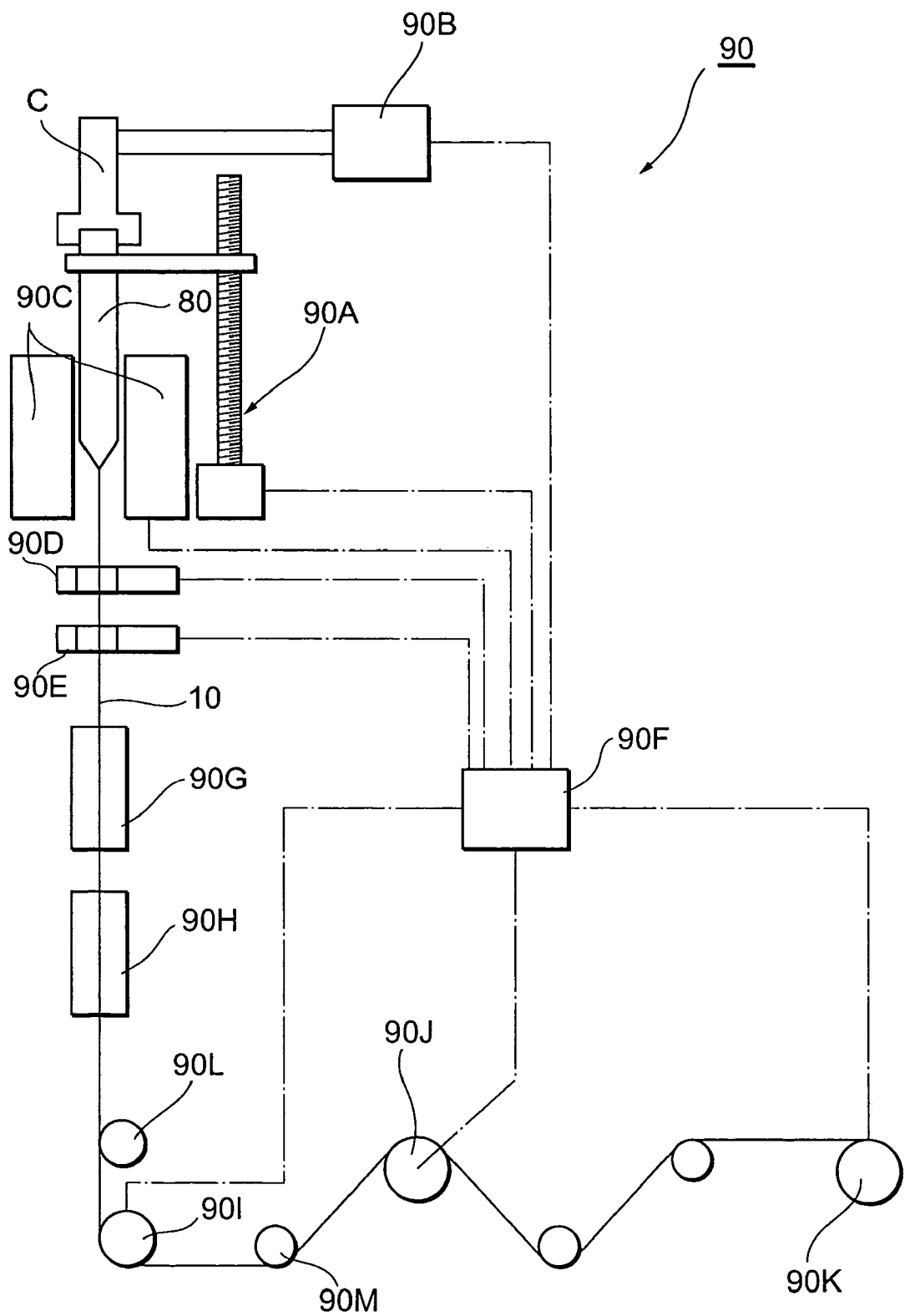
FIG. 7 is a conceptual diagram showing an apparatus for producing the optical fiber of an example.

FIG. 7 is a conceptual diagram showing an apparatus for producing the optical fiber 10. The optical fiber preform 80 is drawn with an optical fiber-producing apparatus 90 to obtain the optical fiber 10. For the drawing operation, the optical fiber preform 80 is attached to a preform-hoisting-and-lowering mechanism 90A and is connected to a pressurizing unit 90B for pressurizing the fiber preform holes 81. The connection is conducted through a cap C having a gas-introducing channel for introducing the gas from the pressurizing unit 90B into the fiber preform holes 81.

The optical fiber preform 80 connected to the pressurizing unit 90B is inserted into a drawing furnace 90C by the preform-hoisting-and-lowering mechanism 90A to be lowered. At this moment, a gas (for example, an inert gas such as nitrogen) is introduced into the fiber preform holes 81 by the pressurizing unit 90B to pressurize them. The optical fiber preform 80 is then heated and melted by the drawing furnace 90C. The heated and melted optical fiber preform 80 is drawn gradually from the lower end to obtain the optical fiber 10. The pressure for pressurizing the fiber preform holes 81 at the time of the production of the optical fiber 10 is about 1.2 kPa, for example.

The optical fiber 10 passes through a diameter monitor 90D and a tension meter 90E both provided at the downstream side of the drawing furnace 90C. Thus, the fiber diameter and the drawing tension are measured. The measured results are sent to a controller 90F. The controller 90F controls the fiber speed during the drawing, the drawing tension, and the like according to the measured results. The fiber speed and the drawing tension in a steady state are about 1.17 m/s (70 m/min) and about 1.47 N (150 gf), respectively, for example.

The optical fiber 10 after passing through the tension meter 90E passes through a first covering coater 90G and a second covering coater 90H in this order to be coated with synthetic resin over the circumference. The optical fiber 10 coated with synthetic resin passes through an oscillation roller 90I and a capstan 90J to be taken up by a take-up machine 90K. The oscillation roller 90I is electrically connected to the controller 90F. It is controlled by the controller 90F to oscillate so that the optical fiber 10 is twisted. The lateral movement of the fiber generated at the time of the fiber twisting by the oscillation roller 90I is prevented from being conveyed to other portions by placing a pair of guide rollers 90L and 90M for suppressing the responding movement of the optical fiber in front of and at the back of the oscillation roller 90I, respectively.

Figure 8:
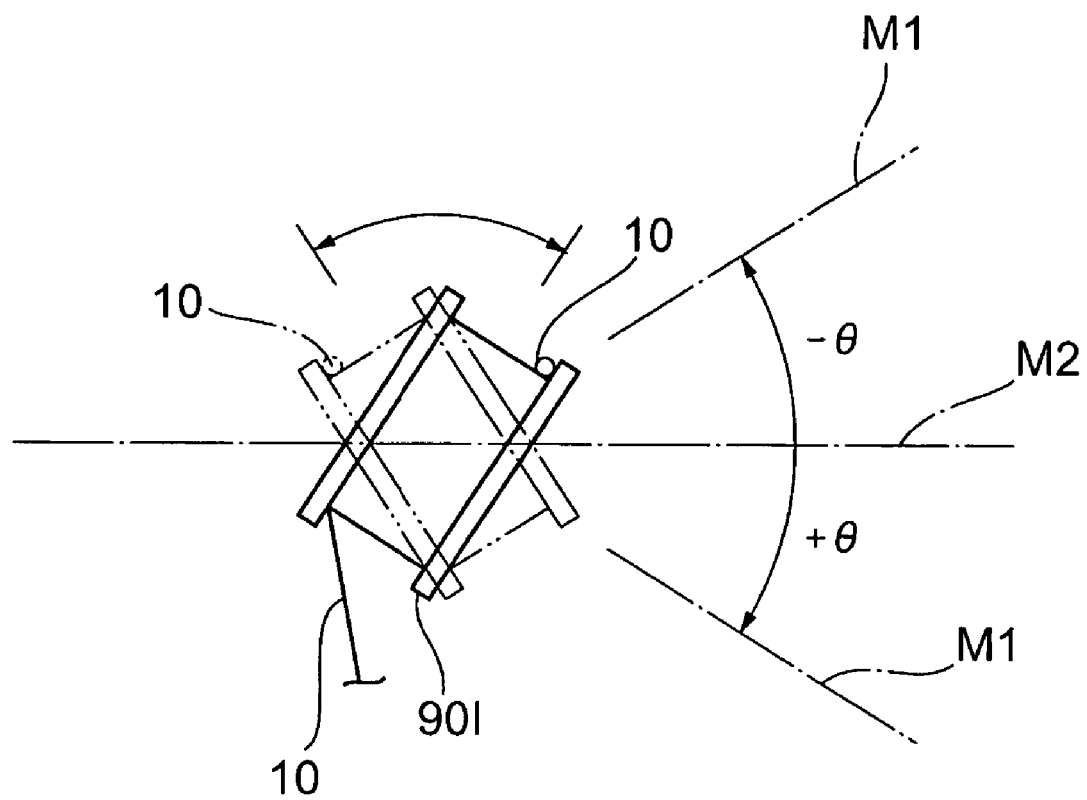
FIG. 8 is a conceptual diagram explaining the operation of the oscillation roller in the apparatus shown in FIG. 7.

FIG. 8 is a conceptual diagram explaining the operation of the oscillation roller 90I. FIG. 8 is a diagram when the oscillation roller 90I is viewed from the upstream side, that is, the second-covering-coater-90H side. The turning axial line M1 of the oscillation roller 90I oscillates within an angular range of ±θ against the predetermined axial line M2. As a result of the oscillation, when the turning axial line M1 slants against the axial line M2 at an angle of ±θ, a lateral force is applied to the optical fiber 10, causing it to roll on the surface of the oscillation roller 90I. Consequently, the optical fiber 10 is twisted. Similarly, when the turning axial line M1 slants against the axial line M2 at an angle of −θ, the optical fiber 10 is twisted in the opposite direction. Thus, the oscillation roller 90I oscillates with an angle of ±θ against the predetermined axial line M2. The repetition of this symmetrical reciprocating motion alternately twists the optical fiber 10 in a clockwise direction and in a counter-clockwise direction when viewed toward the proceeding direction of the fiber (drawing direction).

As described above, the oscillating motion of the oscillation roller 90I enables the reliable production of the optical fiber 10 in which the direction of the twisting is reversed at least once. In addition, because the optical fiber 10 is twisted by the oscillating motion of the oscillation roller 90I, the optical fiber 10 can be produced by an arrangement in which the guide roller 90M, the capstan 90J, and the take-up machine 90K all positioned at the downstream side of the oscillation roller 90I are placed under stationary conditions. This arrangement enables easy production of the optical fiber 10.

As described before, the thus twisted optical fiber 10 has a high excitation efficiency of $Er^{3+}$ by the pump lightwave 62. Consequently, the total length of the optical fiber 10 in the optical fiber amplifier 1 can be decreased significantly. The shortened optical fiber 10 enables the achievement of the following advantages: (1) To reduce the influence of the nonlinear effects such as self phase modulation (SPM), stimulated Raman scattering (SRS), and stimulated Brillouin scattering (SBS); (2) To enhance the population inversion to flatten the gain; and (3) To obtain a compact optical fiber amplifier 1.

Second Embodiment

Figure 9:
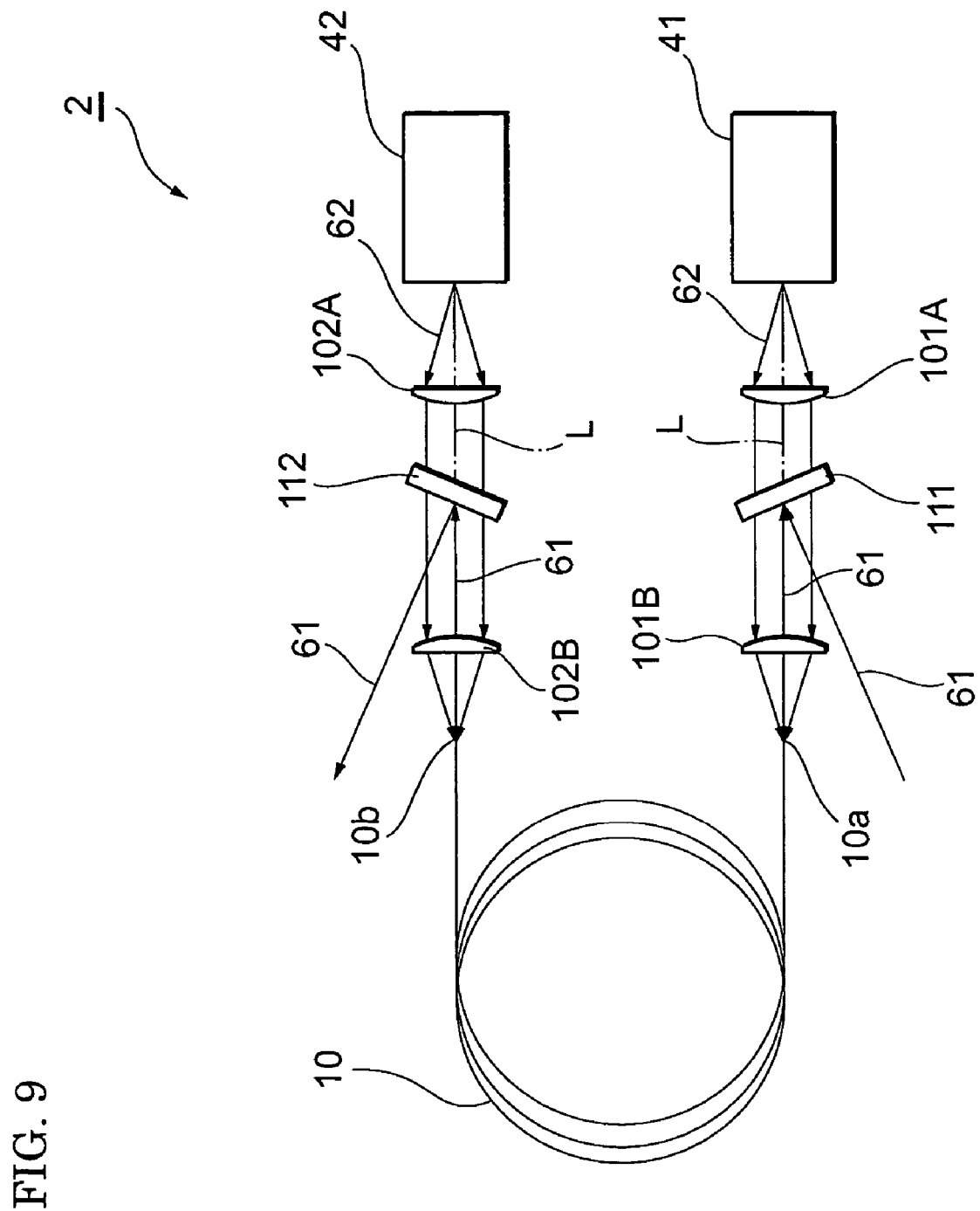
FIG. 9 is a conceptual diagram showing a second embodiment of an optical fiber amplifier of the present invention.

FIG. 9 is a conceptual diagram showing a second embodiment of an optical fiber amplifier of the present invention. An amplifier 2 has an optical fiber 10 having a total length of, for example, 39 meters and a pump light source section 41 optically coupled with an end 10a of the optical fiber 10. The pump light source section 41 outputs a pump lightwave 62 having a wavelength of $\lambda_2$ capable of exciting $Er^{3+}$ contained in the optical fiber 10. The pump light source section 41 is composed of, for example, a group of semi-conductor laser devices and outputs the pump lightwave 62 at an intensity of 0.5 kW. The pump light source section 41 may also be composed of one semi-conductor laser device.

A pair of lenses 101A and 101B are placed between the pump light source section 41 and the end 10a. A dichroic mirror 111 is placed between the lenses 101A and 101B. In the dichroic mirror 111, a film composed of multiple dielectric layers is formed that has high transmittance for the pump lightwave 62 and high reflectance for a signal lightwave 61. The film acts as a means of supplying both a pump lightwave and a signal lightwave to the optical fiber.

The dichroic mirror 111 is placed so as to slant against the center axis L of the optical fiber 10. It (a) allows the pump lightwave 62 outputted from the pump light source section 41 and collimated by the lens 101A to pass through so that it enters the lens 101B and (b) reflects the signal lightwave 61 incident at a predetermined angle to introduce it into the lens 101B. The lens 101B (a) gathers and concentrates the pump lightwave 62 having passed through the dichroic mirror 111 to introduce it into the solid region 14 of the optical fiber 10 and (b) gathers and concentrates the signal lightwave 61 reflected from the dichroic mirror 111 to introduce it into the core region 12. In other words, the dichroic mirror 111 and the lens 101B function as a light-supplying means that combines the pump lightwave 62 and the signal lightwave 61 to supply them to the optical fiber 10.

A pump light source section 42 is placed at the end-10b side of the optical fiber 10. It is optically coupled with the end 10b, has a structure similar to that of the pump light source section 41, and outputs a pump lightwave 62, for example, at 1 kW. A pair of lenses 102A and 102B are placed between the pump light source section 42 and the end 10b. A dichroic mirror 112 is placed between the lenses 102A and 102B. The dichroic mirror 112 has a structure similar to that of the dichroic mirror 111.

The dichroic mirror 112 allows the pump lightwave 62 outputted from the pump light source section 42 and collimated by the lens 102A to pass through so that it enters the lens 102B. The lens 102B gathers and concentrates the pump lightwave 62 having passed through the dichroic mirror 112 to introduce it into the solid region 14 of the optical fiber 10. The dichroic mirror 112 is placed so as to slant against the center axis L of the optical fiber 10. It reflects the signal lightwave 61 outputted from the end 10b and collimated by the lens 102B to output it to the outside of the optical fiber amplifier 2.

In the above explanation, the signal lightwave 61 is reflected from the dichroic mirror 111 to pass through the lens 101B and enter the core region 12 of the optical fiber 10. Conversely, it may be reflected from the dichroic mirror 112 to pass through the lens 102B and enter the core region 12. In this case, the dichroic mirror 112 and the lens 102B become the light-supplying means.

Next, the operation of the optical fiber amplifier 2 is explained below. The pump lightwaves 62 outputted from the pump light source sections 41 and 42 pass through the dichroic mirror 111 or 112, enter the solid region 14 from the end 10a or 10b, travel through the solid region 14, and excite the $Er^{3+}$ doped in the core region 12.

Under the condition that the pump lightwaves 62 are supplied to the optical fiber 10, when the signal lightwave 61 enters the dichroic mirror 111 at a predetermined angle from the outside of the optical fiber amplifier 2, the signal lightwave 61 is reflected from there, enters the core region 12 of the optical fiber 10, and travels through the core region 12. While the signal lightwave 61 is travelling, the $Er^{3+}$ excited by the pump lightwaves 62 emits stimulated-emission light to optically amplify the signal lightwave 61. The optically amplified signal lightwave 61 is outputted from the end 10b of the optical fiber 10, is reflected from the dichroic mirror 112, and exits to the outside of the optical fiber amplifier 2.

Because the optical fiber amplifier 2 uses a twisted holey fiber as the optical fiber 10, the pump lightwaves 62 outputted from the pump light source sections 41 and 42 can effectively excite the $Er^{3+}$. The effect of the high exciting efficiency of the $Er^{3+}$ by the pump lightwaves 62 is the same as in the case of the optical fiber amplifier 1 in the first embodiment.

As described above, in the second embodiment, the dichroic mirrors 111 and 112 have a film composed of multiple dielectric layers that allows the pump lightwave 62 to pass through and reflects the signal lightwave 61. Nevertheless, the directions of the introduction of the signal lightwave 61 and the pump lightwave 62 may be interchanged. In this case, the dichroic mirrors 111 and 112 have a film composed of multiple dielectric layers that allows the signal lightwave 61 to pass through and reflects the pump lightwave 62.

Third Embodiment

Figure 10:
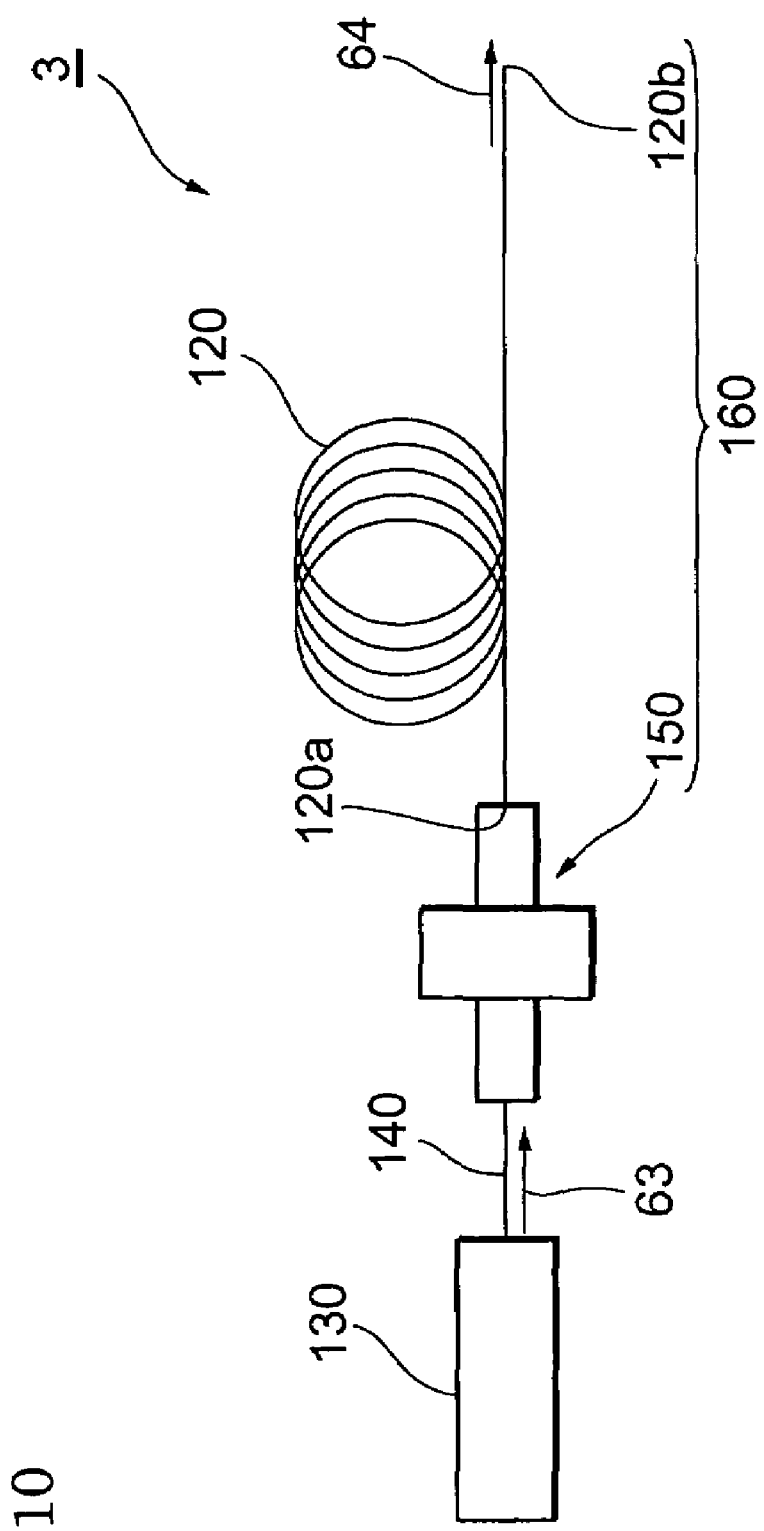
FIG. 10 is a conceptual diagram showing an embodiment of an optical fiber laser light source of the present invention.

FIG. 10 is a conceptual diagram showing an embodiment of an optical fiber laser light source of the present invention. An optical fiber laser light source 3 has an optical fiber 120 whose structure differs from that of the optical fiber 10 in that $Yb^{3+}$ is doped in the core region 12 in place of $Er^{3+}$ as the metallic ion for the optical amplification. The optical fiber 120 has a total length of, for example, 23 meters. The amount of the $Yb^{3+}$ doped in the core region 12 is 600 wt. ppm. The core region 12 has a diameter of about 20 µm. A value of 0.06 is achieved as the NA for the light having a wavelength of $\lambda_3$ emitted from the $Yb^{3+}$. The wavelength $\lambda_3$ of the light emitted from the $Yb^{3+}$ is, for example, about 1.06 µm.

In order to excite the $Yb^{3+}$ doped in the core region 12 of the optical fiber 120, the optical fiber laser light source 3 has a light source section 130 for outputting a pump lightwave 63 having a wavelength of $\lambda_4$ capable of exciting the $Yb^{3+}$. The light source section 130 is composed of, for example, a semi-conductor laser device. The wavelength $\lambda_4$ of the pump lightwave 63 is, for example, about 0.92 µm. The optical fiber laser light source 3 has a connection-use optical fiber 140 and a dichroic filter 150 both for inputting the pump lightwave 63 outputted from the light source section 130 into an end 120a of the optical fiber 120.

The optical fiber 140 is a multimode optical fiber. Its one end is optically coupled with the light source section 130, and the other end is connected to the dichroic filter 150. The dichroic filter 150 allows the pump lightwave 63 having a wavelength of $\lambda_4$ outputted from the light source section 130 to pass through. In other words, it functions as a light-supplying means for supplying the pump lightwave 63 to the solid region 14 of the optical fiber 120. In addition, the dichroic filter 150 selectively reflects at high reflectance (for example, 99.999%) a lightwave having a wavelength of $\lambda_3$ emitted from the $Yb^{3+}$ excited by the pump lightwave 63.

In the optical fiber laser light source 3, an end 120b of the optical fiber 120 reflects a part of the lightwave having the wavelength $\lambda_3$ by the Fresnel reflection and transmits the other part. Therefore, the dichroic filter 150 and the end 120b constitute an optical resonator 160 that is a part of the optical fiber laser light source 3. The optical resonator 160 is not limited to this example. For example, it is possible to further provide at the end 120b a selectively reflecting means such as a dichroic filter that selectively reflects at high reflectance the lightwave having the wavelength $\lambda_3$ emitted from the $Yb^{3+}$. In this case, the selectively reflecting means and the dichroic filter 150 constitute the optical resonator.

Next, the operation of the optical fiber laser light source 3 is explained below. When the light source section 130 outputs the pump lightwave 63, the pump lightwave 63 travels over the optical fiber 140, passes through the dichroic filter 150, and enters the solid region 14 of the optical fiber 120. While travelling through the solid region 14, the pump lightwave 63 excites the $Yb^{3+}$ doped in the core region 12. When the excited $Yb^{3+}$ emits the lightwave having the wavelength $\lambda_3$ by spontaneous emission, the spontaneously emitted light travels through the core region 12 and is subjected to the repetition of multiple reflection in the optical resonator 160. At this moment, the excited $Yb^{3+}$ emits stimulated-emission light as the stimulated-emission phenomenon. The stimulated-emission light resonates and consequently generates laser oscillation. As a result, a laser lightwave 64 having the wavelength $\lambda_3$ is outputted from the end 120b.

The optical fiber laser light source 3 uses the optical fiber 120 that is twisted in the same way as in the optical fiber 10. Therefore, nearly the total energy of the pump lightwave 63 can be used to excite the $Yb^{3+}$, facilitating the formation of the population inversion. As a result, the intensity of the light emitted by the stimulated emission is increased, enabling the production of the high-intensity laser lightwave 64.

In addition, as in the case of the optical fiber 10, the excitation efficiency of the $Yb^{3+}$ is increased. Consequently, the total length of the optical fiber 120 can be decreased. The shortened length enables the following achievements, for example: (1) To reduce the influence of the nonlinear effects such as self phase modulation, stimulated Raman scattering, and stimulated Brillouin scattering; (2) To enhance the population inversion to increase the range of the variable wavelength of the laser lightwave 64 or the range of the wavelength setting of the laser lightwave 64; and (3) To increase the compactness.

Fourth Embodiment

Figure 11:
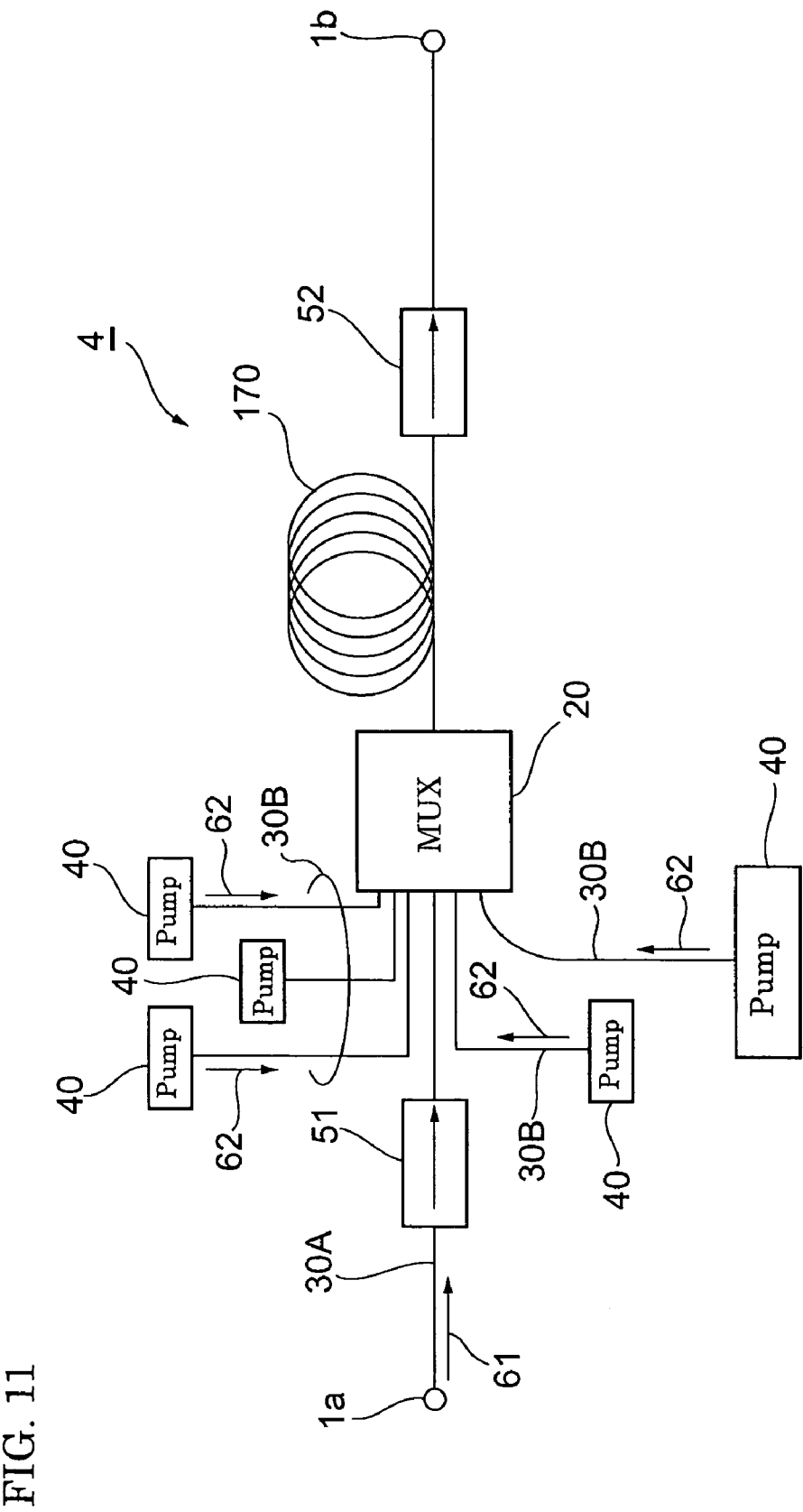
FIG. 11 is a conceptual diagram showing a fourth embodiment of an optical fiber amplifier of the present invention.
Figure 12A:
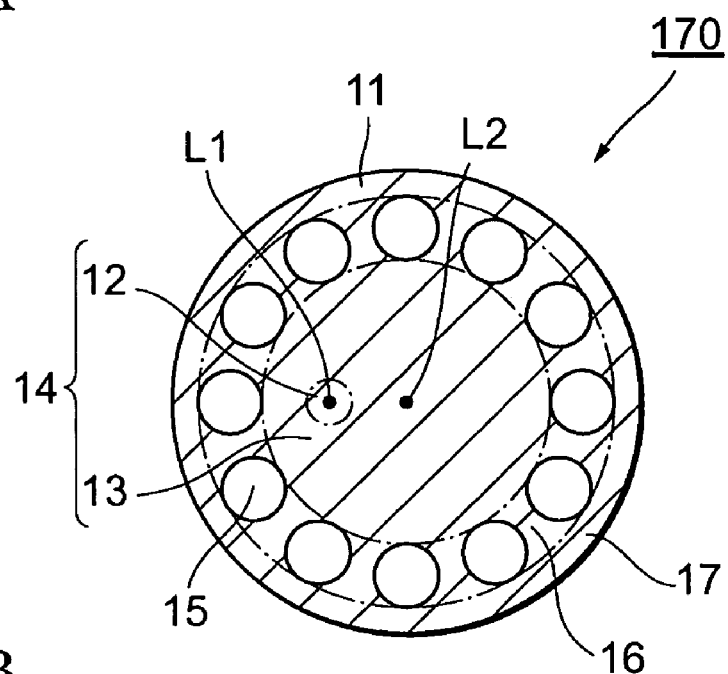
FIG. 12A is a cross section at a plane perpendicular to the direction of the length of an optical fiber of the present invention shown as another example.
Figure 12B:
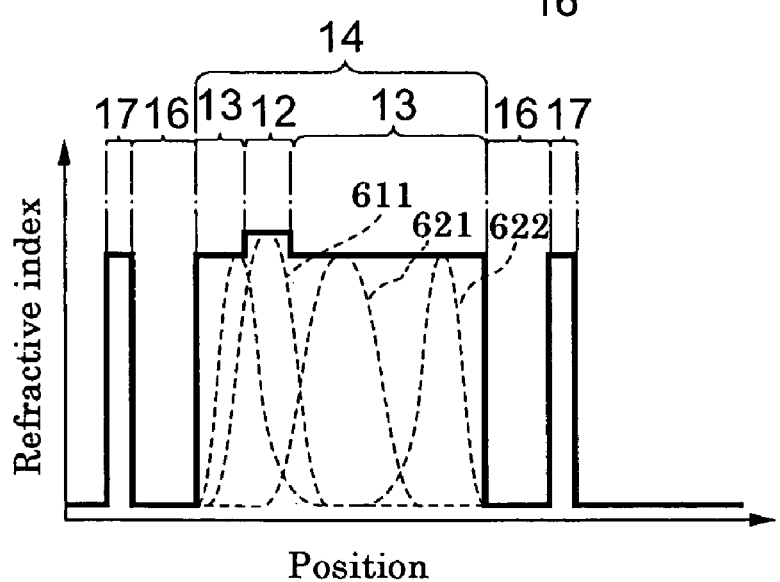
FIG. 12B is a diagram showing a refractive-index profile of the optical fiber.

FIG. 11 is a conceptual diagram showing a fourth embodiment of an optical fiber amplifier of the present invention. An optical fiber amplifier 4 is the same as the optical fiber amplifier 1, except that it has an optical fiber 170. FIG. 12A is a cross section at a plane perpendicular to the direction of the length of the optical fiber 170, and FIG. 12B is a diagram showing a refractive-index profile of the optical fiber 170.

The optical fiber 170 has a structure in which the core region 12 is supplied with the power of a lightwave that is included in the pump lightwave and that is in a mode having no intensity peak at the center axis L2 of the solid region 14. To achieve this structure, the core region 12 is placed at a position apart from the center axis L2. In the explanation below, as in case of the optical fiber 10, it is assumed that the core region 12 is doped with $Er^{3+}$.

Figure 13A:
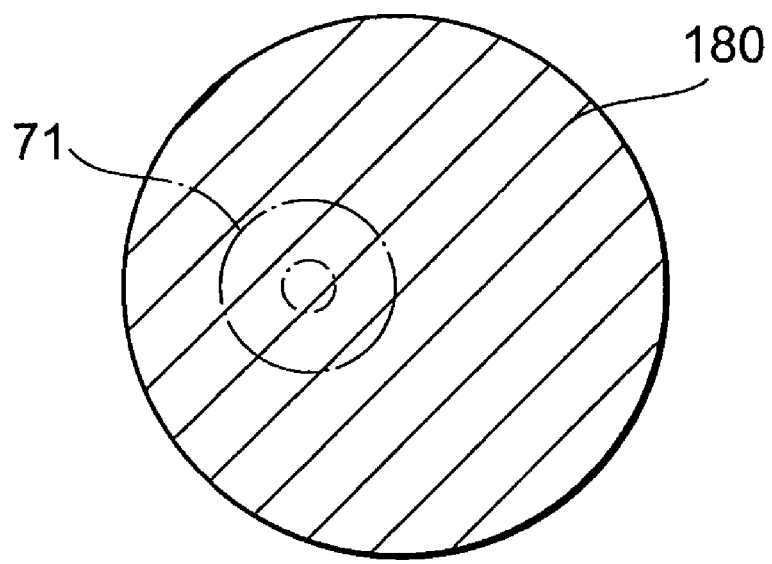
FIG. 13A is a cross-sectional view of a glass material for producing the optical fiber in another example.
Figure 13B:
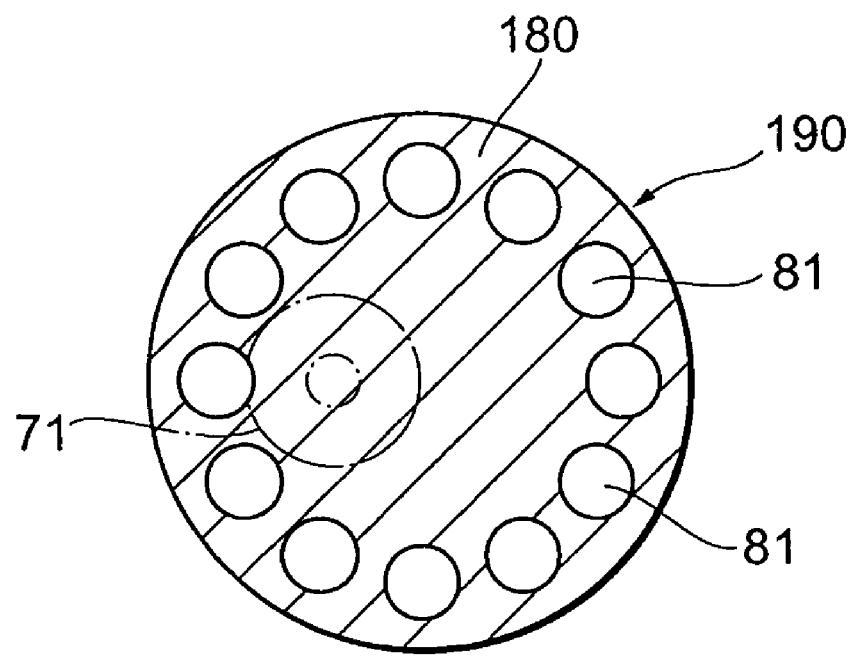
FIG. 13B is a cross-sectional view of an optical fiber preform of the example.

FIG. 13A is a cross-sectional view of a glass material for producing the optical fiber in another example, and FIG. 13B is a cross-sectional views of an optical fiber preform of the example. The optical fiber 170 is produced as described below, for example. First, as in the case of the optical fiber 10, a rod 71 (see FIG. 5A) is formed. After being elongated, the rod 71 is inserted into a pipe 180 that is made of silica glass and that is provided with a hole for housing the rod 71 at a position apart from the center. This arrangement produces a structure in which the glass layer to become the core region 12 is placed at a position apart from the center of the pipe 180 to become the first cladding layer 13. Then, the pipe 180 into which the rod 71 is inserted is collapsed, and fiber preform holes 81 are formed. The thus prepared glass body is elongated until it has a specified diameter to obtain an optical fiber preform 190.

Subsequently, the optical fiber preform 190 is drawn with the optical fiber-producing apparatus 90 to obtain the optical fiber 170. The optical fiber 170 is produced either without oscillating the oscillation roller 90I or by using an optical fiber-producing apparatus in which the oscillation roller 90I is not provided.

The operation of the optical fiber amplifier 4 using the optical fiber 170 is the same as that of the optical fiber amplifier 1. More specifically, the pump lightwave 62 outputted from the light source section 40 travels over the optical fiber 30B, passes through the multiplexer (light-supplying means) 20, enters the solid region 14 of the optical fiber 170, travels through the solid region 14 in a multiple mode, and excites the $Er^{3+}$.

When the signal lightwave 61 is inputted from the input end 1a, it travels over the optical fiber 30A, passes through the multiplexer 20, enters the core region 12 of the optical fiber 170, and travels in a single mode. At this moment, because the $Er^{3+}$ is excited by the pump lightwave 62, the travelling of the signal lightwave 61 through the core region 12 causes the emission of stimulated-emission light. As a result, the signal lightwave 61 is amplified.

As described above, the pump lightwave 62 travels through the solid region 14 in a multiple mode (modes 621, 622, and the like). In this case, however, the center axis L1 of the core region 12 is not coincident with the center axis L2 of the solid region 14. Therefore, even the pump lightwave 62's mode 622 having no intensity peak in the vicinity of the center axis L2 can excite the $Er^{3+}$ doped in the core region 12. As a result, the energy of the pump lightwave 62 can be used effectively to excite the $Er^{3+}$.

In this case, the $Er^{3+}$ can be excited by the pump lightwave 62 more effectively than in the case where the center axis L1 is coincident with the center axis L2. Therefore, as in the case of the optical fiber amplifier 1, the total length of the optical fiber 170 can be further decreased. The effect of the shortened optical fiber 170 is the same as in the case of the optical fiber 10.

EXAMPLE 1 AND COMPARATIVE EXAMPLE 1

An example of the twisted optical fiber 10 is explained below. First, a rod 71 (see FIG. 5A) was formed and elongated through the method explained in the first embodiment. The elongated rod 71 was inserted into a pipe 72 that was provided with a hole for housing the rod 71 at the center. The collapsing operation was performed. Twelve fiber preform holes 81 were formed in the pipe. The thus prepared glass body was elongated until it had a specified diameter to obtain an optical fiber preform 80 ready for the drawing.

Subsequently, the optical fiber preform 80 was drawn with the optical fiber-producing apparatus 90 to obtain an optical fiber. The core region 12 of the optical fiber was doped with 600 wt. ppm $Er^{3+}$, 10 wt. % $GeO_2$, and 4 wt. % $Al_2O_3$. The drawing operation was performed by oscillating the oscillation roller 90I until the drawn length reached about 1 km from the start and without the oscillation after the drawn length exceeded about 1 km.

The fiber speed at the time of the drawing and the drawing tension in a steady state were about 1.17 m/s (70 m/min) and about 1.47 N (150 gf), respectively. When the oscillation roller 90I was oscillated, the oscillation cycle was 125 rpm.

Of the produced optical fiber, an optical fiber having a length of 300 meters was cut from the portion where the oscillation roller 90I was oscillated at the time of the drawing. The optical fiber was used as the optical fiber 10 of Example 1. Another optical fiber having a length of 300 meters was cut from the portion where the oscillation roller 90I was not oscillated at the time of the drawing. This optical fiber was used as the optical fiber of Comparative example 1. The optical fiber 10 of Example 1 and the optical fiber of Comparative example 1 were subjected to the measurement of the absorption property for a lightwave having a wavelength of 0.98 µm in a multiple mode.

The measured results showed that the optical fiber 10 of Example 1 had an absorption of about 3.8 dB/m, and the optical fiber of Comparative example 1 had an absorption of about 1.8 dB/m. The results demonstrated that the optical fiber 10 of Example 1 absorbed a lightwave having a wavelength for exciting the $Er^{3+}$ as the pump lightwave 62 more effectively than the optical fiber of Comparative example 1. In other words, the twisting of the optical fiber achieved the increased efficiency of the excitation of the $Er^{3+}$.

EXAMPLE 2 AND COMPARATIVE EXAMPLE 2

An example of the optical fiber 170 is explained below which has a core region 12 whose center is not coincident with that of the first cladding region 13. First, as in the case of Example 1, a rod 71 was formed and elongated. The elongated rod 71 was divided into two parts.

One of the two parts was inserted into a pipe 180 that was provided with a hole for housing the rod 71 at a position apart from the center. The collapsing operation was performed. Twelve fiber preform holes 81 were formed in the pipe. The thus prepared glass body was elongated until it had a specified diameter to obtain an optical fiber preform 190 ready for the drawing. The other of the two parts was inserted into a pipe 72 that was provided with a hole for housing the rod 71 at the center. The collapsing operation was performed. Twelve fiber preform holes 81 were formed in the pipe. The thus prepared glass body was elongated until it had a specified diameter to obtain an optical fiber preform ready for the drawing. In the individual optical fiber preforms, the region to become the core region 12 was doped with 600 wt. ppm $Er^{3+}$, 10 wt. % $GeO_2$, and 4 wt. % $Al_2O_3$.

Subsequently, the optical fiber preform 190 was drawn with the optical fiber-producing apparatus 90 to obtain an optical fiber 170. Of the produced optical fiber 170, an optical fiber having a length of 300 meters was cut to be used as the optical fiber 170 of Example 2. The other optical fiber preform was also drawn to obtain an optical fiber. Of the produced optical fiber, an optical fiber having a length of 300 meters was cut to be used as the optical fiber of Comparative example 2. The optical fibers in Example 2 and Comparative example 2 were produced under the same drawing condition as that used in Example 1, except that the oscillation roller 90I was not oscillated.

The optical fiber 170 of Example 2 and the optical fiber of Comparative example 2 were subjected to the measurement of the absorption property for a lightwave having a wavelength of 0.98 µm in a multiple mode. The measured results showed that the optical fiber 170 of Example 2 had an absorption of about 3.6 dB/m, and the optical fiber of Comparative example 2 had an absorption of about 1.4 dB/m. The results demonstrated that the optical fiber 170 of Example 2, which had the core region 12 whose center axis L1 was not coincident with the center axis L2 of the first cladding region 13, more effectively absorbed a lightwave having a wavelength for exciting the $Er^{3+}$ as the pump lightwave 62 and that the $Er^{3+}$ was excited with an increased degree. In other words, the arrangement in which the center axes L1 and L2 were not coincident with each other achieved the increased efficiency of the excitation of the $Er^{3+}$ as the metallic ion by the pump lightwave.

The present invention is described above in connection with what is presently considered to be the most practical and preferred embodiments. However, the invention is not limited to the disclosed embodiments, but on the contrary, is intended to cover various modifications and equivalent arrangements included within the spirit and scope of the appended claims.

For example, the optical fiber 170 may be applied to the optical fiber amplifier in the second embodiment and to the optical fiber laser light source in the third embodiment. The solid region 14 may have a three-layer structure in which another cladding region is further provided at the outside of the first cladding region 13. The core region 12 may have nearly the same refractive index as that of the first cladding region 13. Furthermore, it is also desirable to twist the optical fiber 170 in order to effectively use the energy of the pump lightwave to excite the metallic ion. The twisted optical fiber 170 can be obtained by oscillating the oscillation roller 90I in the same manner as in the production of the optical fiber 10 when the optical fiber preform 190 is drawn with the optical fiber-producing apparatus 90.

The entire disclosure of Japanese patent application 2004-280138 filed on Sep. 27, 2004 including the specification, claims, drawing, and summary is incorporated herein by reference in its entirety.

What is claimed is:

1. An optical fiber comprising:
   (a) a solid region that:
      (a1) has a first region doped with at least one type of metallic ion and a second region surrounding the first region, said second region of the solid region being free of holes; and
      (a2) allows a pump lightwave including in its wavelength range a wavelength for exciting the at least one type of metallic ion to travel in a multiple mode; and
   (b) a third region that surrounds the second region and that is provided with a plurality of holes stretching along the length of the optical fiber; the optical fiber being twisted.

2. An optical fiber as defined by claim 1, wherein the direction of the twisting is reversed at least once in the total length of the optical fiber.

3. An optical fiber as defined by claim 1, wherein the amount of the twisting is at least 90 degrees per meter of the optical fiber.

4. An optical fiber as defined by claim 1, wherein the first region has a refractive index higher than that of the second region.

5. An optical fiber as defined by claim 1, wherein the at least one type of metallic ion is a rare-earth ion.

6. An optical fiber as defined by claim 1, wherein the at least one type of metallic ion is $Bi^{3+}$.

7. An optical fiber as defined by claim 5, wherein the first region is further doped with $Al^{3+}$.

8. An optical fiber comprising:
   (a) a solid region that:
      (a1) has a first region doped with at least one type of metallic ion and a second region surrounding the first region, said second region of the solid region being free of holes; and
      (a2) allows a pump lightwave including in its wavelength range a wavelength for exciting the at least one type of metallic ion to travel in a multiple mode; and
   (b) a third region that surrounds the second region and that is provided with a plurality of holes stretching along the length of the optical fiber; the first region being placed at a position apart from the center axis of the solid region.

9. An optical fiber as defined by claim 8, wherein the first region has a refractive index higher than that of the second region.

10. An optical fiber as defined by claim 8, wherein the at least one type of metallic ion is a rare-earth ion.

11. An optical fiber as defined by claim 8, wherein the at least one type of metallic ion is $Bi^{3+}$.

12. An optical fiber as defined by claim 10, wherein the first region is further doped with Al3+.

13. An optical fiber amplifier for optically amplifying a signal lightwave by being supplied with a pump lightwave, the amplifier comprising:
   (a) an optical fiber comprising:
      (a1) a solid region that:
         (a1a) has a first region doped with at least one type of metallic ion and a second region surrounding the first region, said second region of the solid region being free of holes; and
         (a1b) allows a pump lightwave including in its wavelength range a wavelength for exciting the at least one type of metallic ion to travel in a multiple mode; and
      (a2) a third region that surrounds the second region and that is provided with a plurality of holes stretching along the length of the optical fiber; the optical fiber being twisted;
   (b) a light source section for outputting the pump lightwave; and
   (c) a supply means for supplying both the pump lightwave and the signal lightwave to the optical fiber.

14. An optical fiber amplifier as defined by claim 13, wherein the supply means has a film composed of multiple dielectric layers that transmits one member of the group consisting of the pump lightwave and the signal lightwave and reflects the other member.

15. An optical fiber amplifier for optically amplifying a signal lightwave by being supplied with a pump lightwave, the amplifier comprising:
   (a) an optical fiber comprising:
      (a1) a solid region that:
         (a1a) has a first region that is doped with at least one type of metallic ion and that is placed at a position apart from the center axis of the solid region and a second region surrounding the first region, said second region of the solid region being free of holes; and
         (a1b) allows a pump lightwave including in its wavelength range a wavelength for exciting the at least one type of metallic ion to travel in a multiple mode; and
      (a2) a third region that surrounds the second region and that is provided with a plurality of holes stretching along the length of the optical fiber;
   (b) a light source section for outputting the pump lightwave; and
   (c) a supply means for supplying both the pump lightwave and the signal lightwave to the optical fiber.

16. An optical fiber amplifier as defined by claim 15, wherein the supply means has a film composed of multiple dielectric layers that transmits one member of the group consisting of the pump lightwave and the signal lightwave and reflects the other member.

17. An optical fiber laser light source comprising:
   (a) an optical fiber comprising:
      (a1) a solid region that:
         (a1a) has a first region doped with at least one type of metallic ion and a second region surrounding the first region, said second region of the solid region being free of holes; and
    (a1b) allows a pump lightwave including in its wavelength range a wavelength for exciting the at least one type of metallic ion to travel in a multiple mode; and
  (a2) a third region that surrounds the second region and that is provided with a plurality of holes stretching along the length of the optical fiber; the optical fiber being twisted;
(b) a light source section for outputting a pump lightwave that excites the at least one type of metallic ion doped in the optical fiber;
(c) a supply means for supplying the pump lightwave to the optical fiber; and
(d) an optical resonator for resonating the light emitted from the at least one type of metallic ion.

18. An optical fiber laser light source comprising:
(a) an optical fiber comprising:
  (a1) a solid region that:
    (a1a) has a first region that is doped with at least one type of metallic ion and that is placed at a position apart from the center axis of the solid region and a second region surrounding the first region, said second region of the solid region being free of holes; and
    (a1b) allows a pump lightwave including in its wavelength range a wavelength for exciting the at least one type of metallic ion to travel in a multiple mode; and
  (a2) a third region that surrounds the second region and that is provided with a plurality of holes stretching along the length of the optical fiber;
(b) a light source section for outputting a pump lightwave that excites the at least one type of metallic ion doped in the optical fiber;
(c) a supply means for supplying the pump lightwave to the optical fiber; and
(d) an optical resonator for resonating the light emitted from the at least one type of metallic ion.

\* \* \* \* \*